No. 720,569. PATENTED FEB. 17, 1903.
H. DE WALLACE.
TRAIN ORDER SIGNAL.
APPLICATION FILED MAY 16, 1901.
NO MODEL. 6 SHEETS—SHEET 1.

FIG. 1.

WITNESSES
INVENTOR
HARRY DE WALLACE
BY
HIS ATTORNEYS

No. 720,569. PATENTED FEB. 17, 1903.
H. DE WALLACE.
TRAIN ORDER SIGNAL.
APPLICATION FILED MAY 16, 1901.
NO MODEL. 6 SHEETS—SHEET 2.

FIG 2.

WITNESSES
INVENTOR
HARRY DE WALLACE
BY
HIS ATTORNEYS

No. 720,569. PATENTED FEB. 17, 1903.
H. DE WALLACE.
TRAIN ORDER SIGNAL.
APPLICATION FILED MAY 16, 1901.
NO MODEL. 6 SHEETS—SHEET 4.

WITNESSES
INVENTOR
HARRY DE WALLACE
BY Paul & Hawley
HIS ATTORNEYS

THE NORRIS PETERS CO., PHOTO-LITHO., WASHINGTON, D. C.

No. 720,569. PATENTED FEB. 17, 1903.
H. DE WALLACE.
TRAIN ORDER SIGNAL.
APPLICATION FILED MAY 16, 1901.
NO MODEL. 6 SHEETS—SHEET 5.

WITNESSES

INVENTOR
HARRY DE WALLACE
BY Paul O Hawley
HIS ATTORNEYS

No. 720,569. PATENTED FEB. 17, 1903.
H. DE WALLACE.
TRAIN ORDER SIGNAL.
APPLICATION FILED MAY 16, 1901.
NO MODEL. 6 SHEETS—SHEET 6.

WITNESSES

INVENTOR
HARRY DEWALLACE
BY
HIS ATTORNEYS.

UNITED STATES PATENT OFFICE.

HARRY DE WALLACE, OF WATERTOWN, NEW YORK.

TRAIN-ORDER SIGNAL.

SPECIFICATION forming part of Letters Patent No. 720,569, dated February 17, 1903.

Application filed May 16, 1901. Serial No. 60,543. (No model.)

*To all whom it may concern:*

Be it known that I, HARRY DE WALLACE, of Watertown, Jefferson county, New York, have invented certain new and useful Improvements in Train-Order Signals, of which the following is a specification.

This invention relates to improvements in train-order signals and train-stopping devices of the class that are described and claimed in Letters Patent heretofore issued to me and numbered and dated as follows: No. 617,232, dated January 3, 1899; No. 623,503, dated April 18, 1899; No. 642,303, dated January 30, 1900, and No. 657,592, dated September 11, 1900.

My present invention is designed to simplify and improve the mechanism, particularly of the train-order signal, shown and described in my patent of September 11, 1900; and the objects I have in view are especially to simplify the disorder-alarm mechanism and to locate said mechanism and its reservoirs separate from the signal proper, so that they are readily accessible either for the purpose of adjustment and repair without interference with the signal mechanism and so that said reservoirs may be made of sufficient size and strength to stand the heavy pressure required and to do the necessary work.

Another object of my present invention is to provide proper and efficient lubrication of the working parts throughout the signal device, disorder-alarm, and the connections.

Other objects of the invention will appear from the following detailed description, taken in connection with the accompanying drawings, in which—

Figure 6:
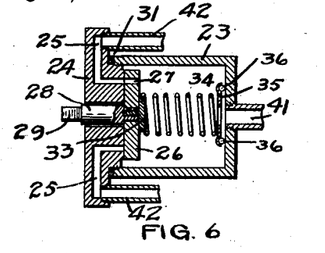

In the drawings, 2 represents a suitable base-plate upon which the parts of the signal mechanism and the disorder-alarm mechanism are arranged and secured. The signal mechanism is provided with a suitable independent base-plate 3, here shown as of circular form, secured to the plate 2 by means of the clamping-lugs 4. A suitable casing 5, preferably of circular form, is secured to the base-plate 3 and incloses the operating mechanism of the signal device. The disorder-alarm device is preferably arranged above the signal mechanism and is secured to the plate 2 by suitable bolts 6, passing through lugs or ears 7 on the base of the disorder-alarm device. Within the casing of the signal mechanism I arrange the operating-shaft 8, which is provided with the beveled gears 9 and 10, that are arranged upon a sleeve and are adapted to be adjusted so that either one thereof may engage the bevel-gear 11 upon a short shaft 12, this shaft being arranged to drive the worm-shaft 13, that engages and drives the worm-wheel 14, by means of which the pointer or hand 15, arranged above the dials 16 and 17, is operated. Within the casing I also prefer to locate the brake-valve 18 and the signal-whistle 19. These parts and their mode of operation are substantially the same as in my patent of September 11, 1900, and I do not consider it necessary to describe in detail the construction of the parts of the signal mechanism or the mode of operation thereof in my present application. The driving-shaft 8 is mounted in bearings 21 and 22, which are preferably formed integrally with the plate 3, although, if preferred, they may be formed separately and secured thereto. The shaft 8 preferably extends through the upper bearing 22 and has a square end 8'. Arranged within the casing 5 is a valve-casing 23, consisting, preferably, of a short cylinder having a head or end 24, with the axis of the cylinder in line with the shaft 8. The cylinder end or head 24 has two ports or openings 25 formed therein and communicating with the interior of the cylinder, (see Fig. 6,) and within the cylinder is arranged a rotating disk-valve 26, arranged to cover the ports 25 and having three openings 27 extending through said disk. These openings are so arranged that as the disk 26 is rotated said openings will pass over the inner ends of the ports 25, permitting communication between the interior of the valve-casing or cylinder 22 and each of said ports three times during each rotation of the disk 26. The disk 26 is secured to a short shaft 28, which passes loosely through an opening in the head 24, and has, preferably, a square end 29, which is connected to the end 8' of the shaft 8 by a sleeve or coupling 30. By this means the disk 26 is rotated with the shaft 8. The end of the cylinder or valve-casing 22 is preferably screw-threaded, and the head 24 is provided with a threaded portion which fits into the end of the casing. A gasket 31 is preferably arranged in the joint; and the parts are secured together, so as to make the joint air-tight. The head 24 is also preferably provided with the depending lugs or feet 32, by means of which the said head and the valve-casing or cylinder 22 are secured firmly to the base-plate 3. I prefer to provide the upper end of the shaft 28 with a suitable shoulder, which forms a bearing for the disk 26, and to secure said disk to the end of the shaft by a suitable screw 33. This disk being firmly secured to the shaft 28 turns freely with the shaft 28 and the shaft 8 in either direction, according to the direction of rotation of the shaft 8. The opening through the head 24 is made considerably larger than the shaft 28, so as to permit at all times the complete and proper seating of the disk 26 upon the inner face of the head 24. A spring 34 is arranged within the casing 23 and bears at one end upon the disk 26, its other end resting upon a disk 35, the under surface of which is made with an annular depression, within which are placed a series of balls 36, forming an antifriction-bearing for said disk. These balls are provided for the purpose of eliminating friction and permitting the spring 34 and the disk 35 to rotate freely with the disk 26. In a valve of this construction it is important that the pressure or resistance at the point of seating be as light as possible consistent with perfect and reliable action. If the spring were too stiff it would cause the valve or the seat, or both, to cut. Therefore the spring must be very light, sufficient only to hold the disk or valve 26 fairly against its seat. If the spring did not revolve with the disk 26 it would be liable to catch and interfere with the turning of the valve. The air-pressure, as will appear from the further description, increases the resistance upon the valve when the device is in operation. For these reasons I have adopted and prefer to use the construction of rotary valve herein shown, although I do not wish to limit myself to this specific construction, as it is obvious that it may be modified in many particulars without departing from my invention.

Figure 8:
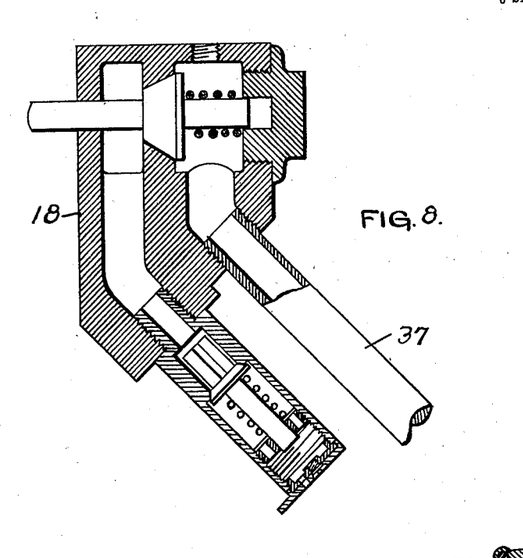
Fig. 8 is a sectional view of the main air-releasing valve that is operated by the signal mechanism.

The valve-casing 23 is in connection with the train-pipe 37, this connection being formed through the casing of the brake-setting valve 18 (see Fig. 8) and through the pipe 38, the reducing-valve 39, and the pipes 40 and 41. The direct and full air-pressure of the train-line pipe is therefore constantly on the rotary valve 26 in the valve-casing 23 unless the reducing-valve, hereinafter described, is adjusted so as to reduce the pressure which extends beyond it. The disorder-alarm reservoirs 43 are secured upon the base 2 in any suitable manner, preferably by the bolt 6, hereinbefore referred to. These reservoirs and the mechanism connected with them are in duplicate. Pipes or tubes 42 are arranged to connect the ducts 25 in the head 24 of the rotary-valve casing with the reservoirs 43. When the shaft 8 and the disk-valve 26 are in motion, turning in either direction, as the ports 27 in the disk 26 pass over the ports in the head 24 of the valve-casing the air passes into the ducts or passages 25 and through the tubes 42 into the reservoirs 43. It will therefore be seen that at each revolution of the valve 26 three pulsations of air-pressure will pass through the ports 27 into the ducts 25 and through the tubes 42 into the reservoirs 43. It will be noted that there are but two of the ducts 25, while there are three ports 27 in the valve 26. The effect in operation, therefore, is to allow the compressed air to pass through but one of the ducts 25 at a given time. Under this arrangement it is impossible for the disk 26 to stop in such position that the air will be passing through more than one of the ports and ducts at a given time. In practice it will usually stop so that both ports are closed. This being the case, in the event of the device stopping, either through a breakdown or from any other cause, one or both of the reservoirs will cease to be supplied with compressed air and the disorder-alarm will be sounded in due time by the automatic action of the device in the manner hereinafter described.

Figure 10:
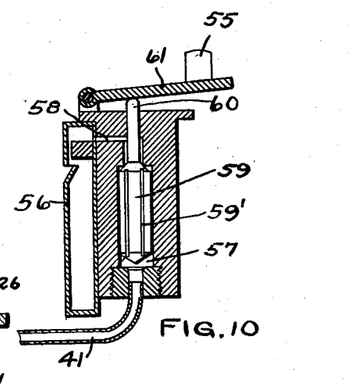
Fig. 10 is a detail of the disorder-alarm and its controlling-valve.

The reservoirs 43 of the disorder-alarm device are preferably formed integrally and will usually be constructed as a single casting, each having an aperture in its outer portion, surrounding which is a flange 44. (See Fig. 7.) The wall of this aperture is screw-threaded, and a cylinder 45, having an open inner end, is inserted into the aperture in the reservoir and is secured therein by means of threads upon its outer surface, which engage the threads upon the walls of the opening. A cap 46 is secured upon the outer end of the cylinder 45, said cylinder preferably projecting slightly beyond the front of the reservoir and the cap being provided with a threaded flange which engages the threaded outer surface of the cylinder. By this means the cylinder is secured in position in the reservoir, and a tight joint is provided around the outer surface of the cylinder. The cap 46 is also preferably provided with a depending tube 47, that is preferably formed integrally with said cap. The cylinder 45 in each reservoir preferably extends nearly to the bottom or inner wall of the reservoir, and the inner end of the cylinder is open, as shown, for example, in Fig. 7. A piston-rod 48, provided with a button 49 on its outer end, passes through the cap 46 and through the tubular extension 47 upon said cap, and the inner end of said piston-rod is provided with a piston that fits snugly within the cylinder 45. This piston is preferably made up of the two disks 50 and 51, between which a leather or other packing 52 is arranged. These disks are secured to the end of the piston-rod by suitable nuts 53, and while the piston is free to move freely within the cylinder it forms an air-tight joint with the wall thereof. A spring 54 is arranged surrounding the tube 47 and between the cap 46 and the outer plate 50 of the piston. The tube 47 serves as a stop to limit the outward movement of the piston, and this tube also serves to prevent the spring from being entirely compressed or compressed to too great an extent, and the spring cannot therefore become strained or weakened. Pivoted upon the front walls of the reservoirs are the levers 55, which extend over the ends of the cylinders and each of which is provided with an opening through which the piston-rod 48 extends. The pistons are adapted to travel freely without moving the levers until they have been forced substantially to the inner ends of the cylinders, when the button 49 will come in contact with the lever 55, and thereafter said lever will move with the piston-rod. The disorder-alarm valve and whistle is shown in detail in Fig. 10. This device consists of a small whistle 56, with a valve-chamber 57 and a duct 58 connecting with the outer part of the whistle. The tube 41 connects with the inner part of the valve-chamber, and a valve 59 is arranged in said chamber and is provided with a stem 60, which extends through the front of the valve-casing. A lever 61 is pivoted on the valve-casing and extends over the end of the stem 60. This lever extends at right angles to the levers 55 and projects beneath both of said levers. The lever 61 is held in its elevated position by means of the valve-stem 60, and it may be depressed by depressing either of the levers 55. The casing for the disorder-alarm valve is preferably made separate and is provided with lugs 62, which project over the front of the reservoirs, and the casing is secured in position by means of the screws 63. The valve 59 consists, preferably, of a cylindric body arranged within the valve-casing and provided with a series of longitudinal grooves 59' in its outer surface. This valve is adapted to seat at either end of the cavity in the valve-casing, and thereby to shut off the passage of air to the alarm 56. When the valve 59 is seated at either end of the valve-casing, the air is shut off from the whistle or alarm 56. While the valve is moving from one position to the other—that is, while it is not seated at either end of the cavity—the air can pass from the tube 41 through the ducts 59', the duct 58 to the whistle 56, and said whistle will be sounded during the interval of time while the valve 59 is moving in the cavity in the valve-casing from one of said seats to the other.

Figure 3:
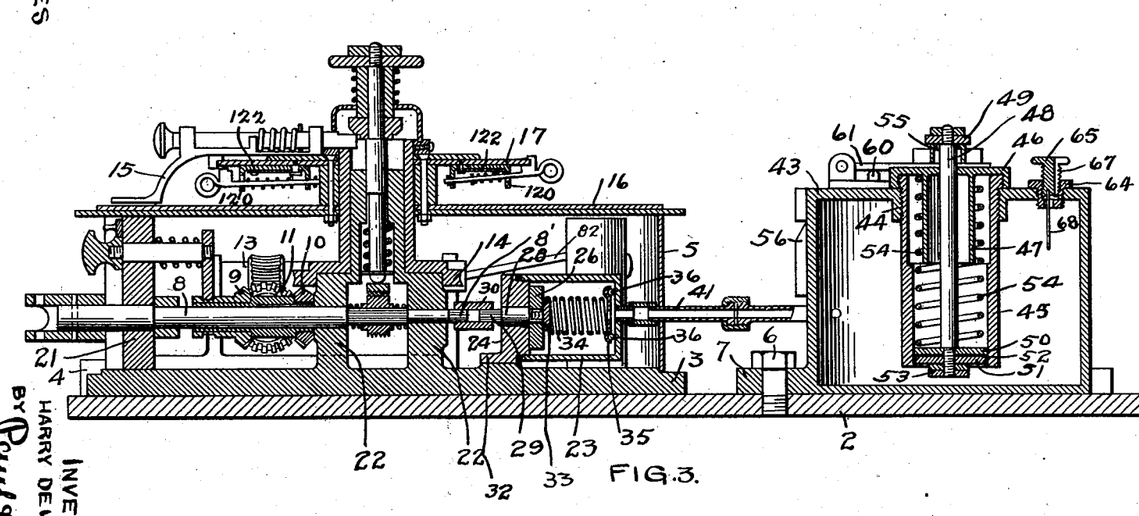
Fig. 3 is a vertical section on a plane at right angles to the section of Fig. 2, this section being taken on the line 3 3 of Fig. 2.
Figure 4:
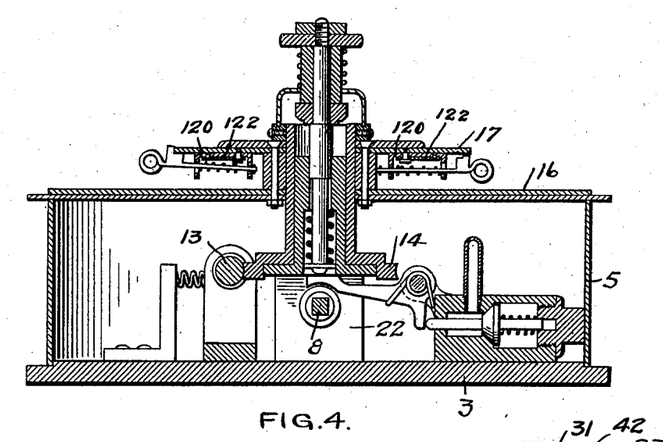
Fig. 4 is a transverse section of the signal device.
Figure 5:
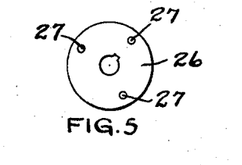
Figs. 5 and 6 are details of the rotary valve.
Figure 13:
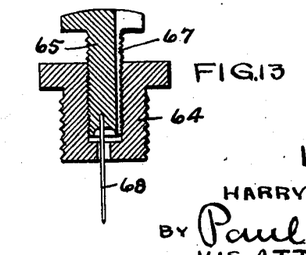
Fig. 13 is a detail of the escape-valve for the disorder-alarm reservoir.

Each reservoir is provided with a device which permits the air to slowly leak out of the reservoir. The device which I prefer to use for this purpose is shown in position in one of the reservoirs in Fig. 3 of the drawings, and it is shown in detail in Fig. 13. This device consists of a bushing 64, which is screwed into the wall of the reservoir. This bushing may be screwed into any part of the reservoir. It is preferably arranged in the face-wall thereof, as shown in Fig. 3. The bottom of the bushing has an opening or aperture therein communicating with the interior of the reservoir. A screw-threaded plug 65 screws into the bushing, and it is provided with a small duct 67, as shown in Fig. 13. A pin 68 is inserted in the bottom of the plug, and it projects through the hole in the bottom of the bushing. The pin 68 is set into the plug in a slightly eccentric position, so that as the screw is turned the pin will sweep around in the hole and clear it of any gummed oil or other obstruction that may lodge in it. The plug 65 may be adjusted so as to regulate the escape of air through the duct 67, and the plug may be quickly removed, if necessary, so as to clean the duct 67 or to clean the interior of the bushing. By removing the plug 65 when the reservoirs are filled with compressed air the escape of the air through the interior of the bushing will blow all dirt and oily matter out of the bushing. This readily adjustable and removable "leak" device is the more important, as I now prefer to lubricate the piston-packings in the cylinders, as well as the rotary valve 26, by placing a small quantity of oil inside of the reservoirs when the pressure is off. This is preferably accomplished by means of the plugs 69, arranged in the wall of each reservoir. (See Fig. 7.) At such times as there is no pressure in the reservoirs—as, for instance, when a stop of a few minutes' duration is made, or while the engine is lying at the roundhouse—the oil gravitates down the tubes 42 and through the ducts 25 to the seat of the rotary valve. By this means the rotary disk-valve 26 is lubricated. If one of the ports 27 of said disks happens to be open at the time when the device is not in motion and no pressure is on, then the oil will flow into the rotary-valve casing and remain there till the device is set in motion again and the pressure is turned on, when the compressed air will force the oil out of the rotary-valve casing and up into the reservoir. When the oil goes up into the reservoirs, as just described, it is thoroughly broken up into the finest of vapor. This vaporized oil finds its way into the open ends of the cylinders, lubricating the packing of the piston thoroughly. This oil-vapor also finds its way to the leak device above described, and some of it naturally escapes to the atmosphere through this vent. The oil thus carried to the point of the leak will in the course of time become thick and gummy. Hence it is necessary to construct these parts so that they may be readily cleared if they do become clogged.

Figure 7:
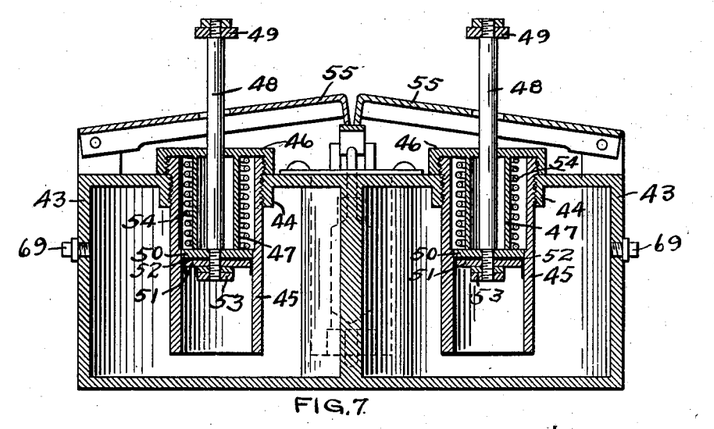
Fig. 7 is a transverse section through the disorder-alarm reservoirs, showing the cylinders and pistons arranged therein.

From the foregoing detailed description it is believed that the operation of the disorder-alarm device will be readily understood.
When the device is in operation, the reservoirs will be constantly supplied with air under pressure by means of the rotary valve 26 and the tubes connecting the rotary-valve casing with said reservoirs. The pressure of air in the reservoirs will force the pistons outward against the ends of the tubes 47, as illustrated in Fig. 7 of the drawings. The valve 59 will also be held by the pressure of the air in the pipe 41 against the outer seat in the valve-casing, and the valve-stem 60 will project through the front of the valve-casing against the lever 61. As long as the device is in operation a small quantity of air will constantly escape through the duct 67 in the plug 65. This, however, will be more than compensated for by the uncovering of the ducts 25, as each port 27 passes over the end of said duct in the rotation of the valve 26. Each reservoir will therefore be kept filled with air at the desired pressure, and the pistons and piston-rods will be held in their outer positions, or, in other words, the pistons will be constantly held against the ends of the tubes 47. When the train stops or a breakdown in the signal mechanism occurs, or if for any reason the valve 26 ceases to rotate, one or the other, or possibly both, of the ducts 25 will be closed by the disk 26. As the air leaks out of each reservoir through the leak device already described the pressure will become reduced in the reservoir, and after a short time, generally about a minute, the spring 54 will force the piston inward and the button 49 will move the corresponding lever 55, and a movement of either lever 55 will move the lever 61, forcing the valve 59 slowly along in the cavity in the valve-casing 57 until it becomes seated at the other end of the cavity. The valve 59 will travel slowly during this inward movement, owing to the fact that it is moving against the pressure of the air in the pipe 41. The valve 59 is made to fit the cavity in the valve-casing 57 just freely enough to be readily forced outward when the engine starts up and free enough to permit of being forced back to the seat at the inner end of the valve-cavity by the spring 54 operating upon the piston in the reservoir. While the valve 59 is traveling in the valve-cavity, the air from the pipe or tube 41 will pass through the flutes or ducts in the outer surface of the valve-body, and the whistle will be sounded until the valve is seated again at the inner end of the cavity. When the engine starts up or when the rotary valves again begin to operate, the pressure of the springs will be taken off the levers 55 as the pistons are forced outward by the pressure of air in the reservoirs, and the air from the pipe 41, entering the valve-casing 57, will force the valve 59 outward, and the valve-stem 60, coming in contact with the lever 61, will force said lever outward, and the whistle will be sounded for a short interval while the valve is traveling outward and until it has become seated at the outer end of the cavity in the casing. The outward movement of the valve 59 is very quick as compared with its inward movement. During the inward movement the whistle will usually be sounded for a period of eight to ten seconds, while during the outward movement the whistle will not be sounded longer than from one to two seconds. When the valve 59 is seated at either end of the valve-cavity, the whistle will not be sounded, and, as before explained, this alarm will be operated only during the interval of travel of the piston 59 in the cavity in the valve-casing 57.

In the device as I have constructed it the main shaft 8 makes seventy-seven revolutions during each mile of travel of the locomotive, and under the construction of rotary valve herein shown air is admitted to each of the reservoirs two hundred and thirty-one times per mile of engine travel. The ports in the rotary valve are quite small, being, as usually constructed, only one-sixteenth of an inch in diameter; but with the seventy pounds pressure from the train-pipe enough air passes through them to sustain the reservoirs at an even or apparently even gage at any rate of speed.

Figure 1:
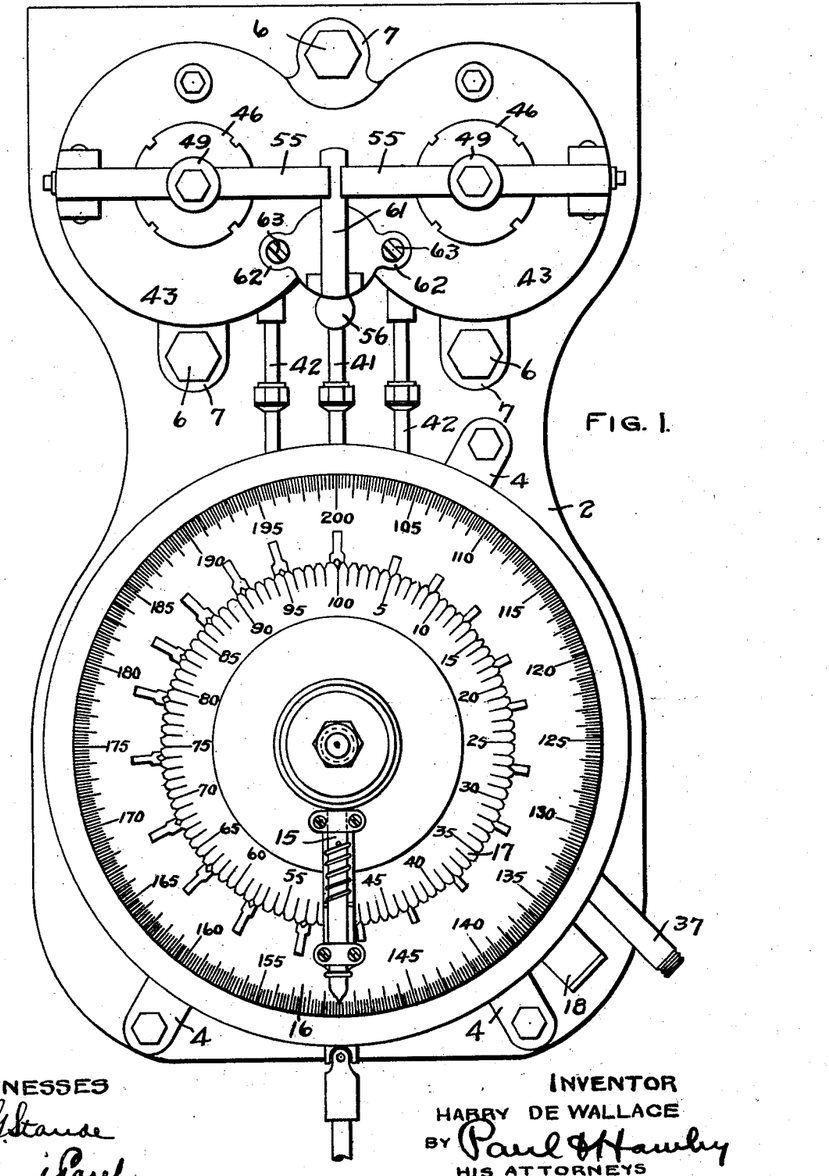
Figure 1 is a front face view of the train-order signal and the coöperating disorder-alarm device.
Figure 2:
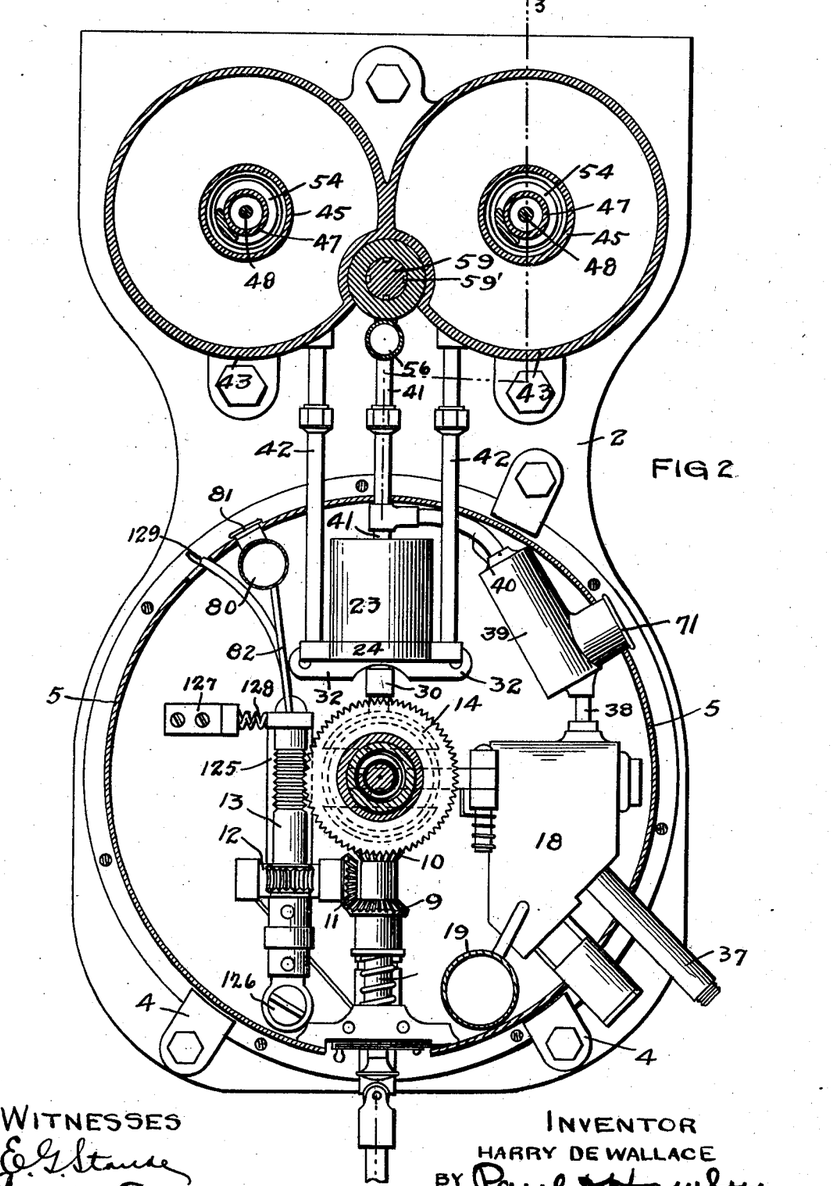
Fig. 2 is a vertical section of the same.

The combined reducing-valve and strainer 39 (shown in Fig. 2 and shown in detail in Fig. 17) is important in the operation of the device. This device is arranged between the main brake-setting valve 18 and the rotary valve and the other disorder-alarm parts. The strainer is for the purpose of straining the air and preventing dirt and the thick gummy oil from the pumps and other parts of the air-brake system from entering the rotary-valve cylinders and connecting parts and interfering with their free and efficient work. The dust coming up through the air-pipes wears and cuts the valves and packing of the cylinder, and the thick oily substances cause the delicate parts to stick and clog. The object of the reducing-valve is to reduce the full train-line pressure to a smaller amount—for instance, thirty-five or forty pounds—when it passes through the rotary valve and from that part into the reservoirs of the disorder-alarm attachment in order to reduce the friction or resistance of the working parts. By reducing the pressure in this way less power is required to operate the rotary valves, there is less wear upon its parts, and the device admits of much less bulky construction. The same advantages are also obtained in the reservoirs, the cylinders, the alarm-valve, the whistle, and the other connected parts. The combined strainer and reducing-valve 39 consists of a valve-casing of suitable size (see Fig. 17) having within it a cavity 70, with a removable cap 71, and this cavity has placed within it a small sponge or other fine porous substance. This substance is packed into the space 70 rather tightly. The sponge or other straining material may be placed in the cavity after removal of the cap 71, and this cap, as shown in Fig. 2 of the drawings, is preferably arranged upon the outside of the casing 5. This permits the insertion and removal of the sponge or other straining material without dismantling the machine. A suitable perforated disk of any suitable material may be arranged upon either side of the sponge or other straining material, so as to prevent said material from being crowded into the air-passages. A valve 72, provided with a suitable valve-stem 73, which passes through the perforated disk 74, is held against the valve-seat 75 by a suitable spring 76. The end of the valve-casing is provided with a suitable plug 77, and the pipe 40, already described, is connected to a threaded opening in the plug 77. The disk 74 is preferably screwed into the valve-casing, and by means of this disk the tension of the spring upon the valve may be adjusted.

In practical operation the spring 76 is usually compressed till it offers a resistance of thirty-five or forty pounds. By this means and for the purpose hereinbefore pointed out the air-pressure at all points beyond the combined strainer and reducing-valve will be reduced, and it may be reduced to any pressure desired.

Figure 9:
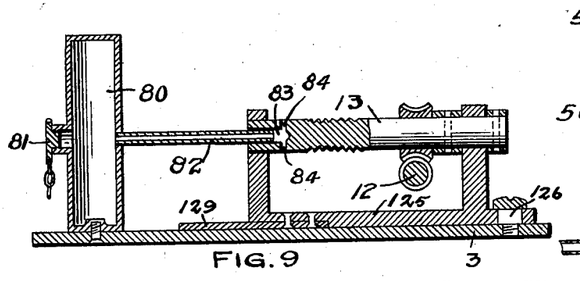
Fig. 9 is a detail showing the lubricating-reservoir and means for lubricating the driving-shafts.

It is essential that the apparatus of the train-order signal be automatically lubricated while it is in operation, and it is very desirable that the lubrication shall automatically cease as soon as or soon after the machine ceases to operate. I have already explained the method of lubricating the pistons in the disorder-alarm reservoirs and also of lubricating the rotary valve and its seat. In the lubrication of the rotary-valve seat there will be some oil that will pass out through the head 24 and pass along the shaft 28 and upon the shaft 8. Sufficient oil will be supplied in this manner to the shaft 8 to lubricate all of the bearings and the tripping-worm on the main shaft 8 between the bearings 22 22. By this means the oil that wastes through the rotary-valve-shaft bearing is permitted to gravitate the full length of the shaft 8, and in its course it lubricates all of the bearings of that shaft. For the purpose of lubricating the bearings of the worm-shaft 13 and the other bearings of the device I provide an oil-tank 80. (See Figs. 2 and 9.) This oil-tank is located in the upper part of the casing 5 and is preferably provided with a filling-orifice and a cap 81, that is located outside of the casing 5. This cap closes the filling-aperture, so as to make the tank air-tight. A single tube 82 leads downward from the tank 80 and conducts the oil into the hollow end of the worm-shaft 13. The end of the worm-shaft is hollowed out at 83 and is provided with a cross-duct 84 for the purpose of letting the oil out onto the worm, and then it gravitates down the worm-shaft to the working parts below. This single tube oils all of the bearings of the signal device below the main-shaft bearings 22. The oiling device herein described is, in effect, a temperature or expansion lubricator. When the cap is screwed down tight, the oil will not flow out through the single tube except upon a change of the temperature within the tank. This rise of temperature inside the tank causes an expansion of the air within the tank, and this displaces the oil and forces it out of the single tube into the end of the worm-shaft. In practice the tank will generally be filled at the roundhouse while the engine is either cold or while it is being fired up, and at that time the slowly-rising temperature will barely start the oil to flow out of the tube and down over the several parts beneath the end of the tube which require lubrication; but not until the engine has become heated to a high degree, as after it has started on its run, will the oil flow from the tube in any considerable quantity, and even during the run, from the fact that the temperature in the cab while the engine is working is constantly changing, rising when stops are made or when the speed is low and lowering when the speed has attained a high rate, the feed of the oil is prolonged and extended over the entire period of the engine's run. This device, therefore, saves oil, equalizes its distribution, and keeps the mechanism constantly and freely lubricated.

Figures 14, 15, 16, 17, 18, 19, 20:
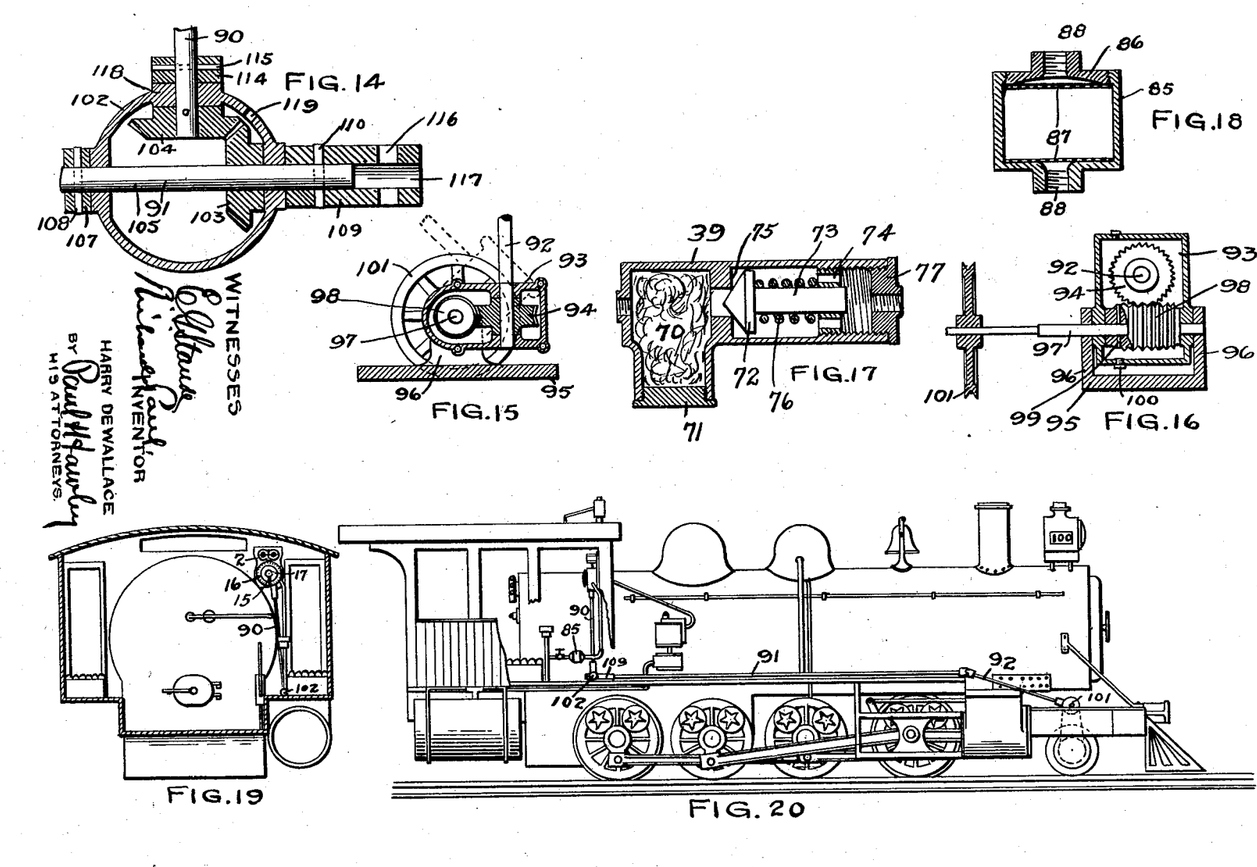
Fig. 14 shows the arrangement of the miter-gearing and inclosing case in the driving-shaft.
Figs. 15 and 16 are details of the worm-gearing and connections, through which power is transmitted from the locomotive-axle to the driving-shaft.
Fig. 17 is a detail section of the strainer and reducing-valve.
Fig. 18 is a detail of the strainer that is arranged in the main air-pipe.
Fig. 19 is a transverse section of a locomotive-cab, showing the arrangement of my device therein.
Fig. 20 is a side elevation, partly broken away, illustrating the application of my device to a locomotive.

In Fig. 18 I have shown another and a larger strainer 85, which is placed in the train-pipe between the pump and the main device, as will be seen by reference to Fig. 20, where the device and its connections are shown on the locomotive. This strainer is made by using a heavy casting, known as a "reducer," and a bushing, which is screwed into the end of the reducer. The bushing 86 forms a removable cap or end for the strainer-casing or reducer, and within the casing when the device is in use I place a suitable sponge or other like substance to accomplish the straining of the air. Perforated disks 87 are placed inside of the casing over the air-passages 88, and the sponge or straining material is compressed between them. This strainer is intended to catch and hold all of the coarse dirt and thick oily substance which is forced back into the train-pipe by the air-pump. The strainer prevents this material from reaching the signal device. Experience shows that some of the finer dirt will be forced through this strainer and be carried up into the signal device; but as the main valve and the signal-whistle have large openings and parts very fine dirt particles if nearly free from oily matter have little bad effect upon these parts. The rotary valve and other disorder-alarm parts being much smaller in construction and having more delicate work to perform, it has been found to be important in order to secure their perfect operation to add the small strainer already described, which is located in connection with the air-reducing valve, as shown in Fig. 17. The small strainer and the reducing-valve already described also serve to prevent the oil which flows to some extent by capillary attraction from the rotary valve from running down into the main valve 18.

The signal mechanism is preferably driven from one of the axles of the locomotive in the same general way as illustrated and described in my patent of September, 1900. As here shown, the main driving-shaft 8 has coupled to it a vertical shaft 90. This shaft is connected by suitable miter-gears to a shaft 91 that extends forward along the side of the locomotive and either above or below the running part. The forward end of this shaft has coupled to it the inclined shaft 92, and the end of this shaft is mounted in bearings in a casing 93 (see Figs. 15 and 16) and has the worm-wheel 94 arranged within the casing and secured upon the shaft 92 between its bearings. 95 represents a suitable base, formed with lugs 96, and the casing 93 is arranged between these lugs (see Fig. 16) and is held in place by the adjustable pulley-shaft 97, which is mounted in bearings in the lug 96 and passes through the casing 93 and has secured upon it within the casing the worm-gear 94. The worm 98 is preferably secured to the shaft 97 by means of a pin 99, passing through the worm and through the shaft, and this pin is preferably opposite an opening in the casing 93, that is provided with a screw-threaded block 100. By removing this block the pin can be removed and the shaft withdrawn from the worm. The casing 93 has one side preferably detachable and secured in position by any suitable means. The base 95 is clamped to the engine-frame in a position convenient for connecting the pulley 101, which is mounted upon the shaft 97 and the sheave placed on the axle of the truck by means of a flexible steel belt. The sheave on the axle may be attached to the axle between the wheels or to the end of the axle just outside of one of the wheels. The casing 93, with the worm-gear 94, as indicated by dotted lines in Fig. 15, may be swung to almost any angle to afford suitable attachment to the other connections extending between said bracket and the mechanism in the cab. This makes a very convenient connection that may readily be adapted to any class or make of engines. The casing 93 when assembled is oil-tight, and in operation about once a round trip oil is put into it through a suitable opening at the top, and it lies at the bottom of the casing. The worm turning in this casing gathers up the oil, and as the worm revolves very rapidly, even at a moderate speed of the locomotive, it throws the oil in every direction, thus lubricating all of the working parts and bearings perfectly.

In Fig. 14 I have shown a convenient, compact, and dirt-proof miter-gear casing for the connection between the shafts 90 and 91. The casing 102 is preferably formed in two parts, held together by suitable screws or other means. The miter-gears 103 and 104, which are secured to the shafts 105 and 90, respectively, are arranged within the casing 102. The horizontal short shaft 105 extends through the casing and is held from longitudinal movement or play by the collar 107 and its pin 108 at one end and by the sleeve 109 and the pin 110 at the other end. The main driving-shaft 91, extending from the worm-gear bracket, is attached to the sleeve 109 through the socket 117 and is held in place and allowed some lengthwise movement by a pin playing in the slot or hole 116. The vertical shaft 90 is held in place by a collar 114 and pin 115, which bears on the boss 118 on the miter-gear casing. A small protected opening is made at 119 for the purpose of oiling the miters. The casing is so constructed that the oil may at least half fill the case, and the gear 103 will pick it up and carry it to all the bearings. The practical application of the miter-gear casing and its connections is shown in Fig. 20. This casing may be placed either above or beneath the running part, and in either position will serve its purpose equally well.

Figure 11:
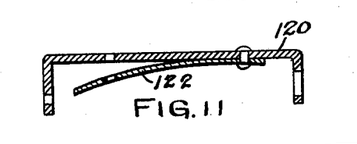
Figs. 11 and 12 are details showing improved constructions of the triggers that are connected to the dial of the signal mechanism.
Figure 12:
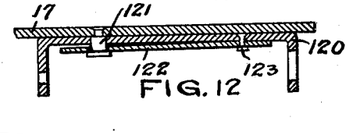

In Figs. 3, 11, and 12 I have shown an important addition to the trigger-shoe equipment of the main signal device. As here shown, 120 represents one of the shoes secured to the under side of the small dial 17. 121 is the rivet which is used to secure the shoe to the under side of the small dial and upon which the shoe swivels, as in the construction shown and described in my patent of September, 1900. 122 represents a small flat spring riveted to the shoe at 123. The other end of this spring is provided with a hole slightly larger than the shoulder of the rivet 121, but smaller than the head of the rivet. Before assembling these parts the spring is bent into the form shown on Fig. 11, and when the rivet 121 is inserted and drawn up it brings the free end of the spring into the position shown beneath the dial in Fig. 12. The object of this spring is to keep the outer end of the shoe against the under side of the dial with sufficient tension to prevent it from vibrating or swinging loosely about or getting out of position when wanted for setting. When this spring is not used, the shoes will drop down when released and several of them may become grouped together, and it also occurs sometimes that one shoe will drop down behind another, so that when the trigger set is discharged by the pointer or hand the unused trigger will interfere with the releasing of the signal. Under the present construction when a trigger is discharged it will remain where it is released until wanted again for setting, and the jar and vibration of the cab will not disturb its position.

As in my patent of September, 1900, the worm-shaft 13 is mounted upon standards that are formed upon or secured to a movable plate 125, which is preferably pivoted to the base-plate by means of a screw or pivot 126. A bracket 127 is arranged upon the base-plate, and a spring 128 engages this bracket and also engages the standard that is located at the opposite end of the plate from the pivot 126, and this spring tends to hold the plate 125 in such position that the worm on the shaft 13 is in engagement at all times with the worm-wheel 14. When it is desired to disengage the worm from the worm-wheel, a slide 129, which extends through the wall of the casing, is operated, and this slide tends to move the plate 125 against the tension of the spring 128, so as to disengage the worm on the shaft 13 from the worm-wheel 14. The disengagement of the worm from the worm-wheel permits the hand or pointer to be set at zero at any time or permits it to be set at any desired point on the dial.

I do not in this application claim the lubricating device, herein shown and described, having claimed the same in a separate application, Serial No. 95,298, filed February 24, 1902; nor do I claim the miter-gear casing, having claimed the same in a separate application, Serial No. 95,299, filed February 24, 1902; nor do I herein claim the gear-case and bracket, having claimed the same in a separate application, Serial No. 95,297, filed February 24, 1902.

A detailed description of the operation of the device is believed to be unnecessary, as the foregoing description of the construction and arrangement of the various parts of the mechanism will disclose fully the mode of operation, especially in view of my former patents hereinbefore referred to, in which the operation of the signal device and the disorder-alarm is fully set forth. I do not, however, confine myself to the details of the construction of the various parts herein shown and described, as it will be readily understood that many of them may be varied in many particulars without departing from my invention.

I claim as my invention—

1. The combination, with a driving-shaft, of a disorder-alarm mechanism, and a continuously-rotating valve arranged to control the disorder-alarm mechanism, substantially as described.

2. The combination, with a driving-shaft, of a disorder-alarm, a plurality of compressed-air reservoirs controlling said alarm, and a continuously-rotating valve governing the admission of air to said reservoirs, substantially as described.

3. The combination, with a driving signal-shaft, of a plurality of compressed-air reservoirs, a disorder-alarm arranged to be controlled from either of said reservoirs, and a continuously-rotating valve arranged to admit air under pressure successively to each of said reservoirs, substantially as described.

4. The combination, with a driving-shaft, of a plurality of reservoirs, cylinders projecting into said reservoirs, pistons arranged to travel in said cylinders, springs adapted to force said pistons inward, means for supplying air under pressure to said reservoirs, an alarm mechanism arranged to be operated by one or both of said pistons, and means for operating said alarm when either of said pistons is permitted to travel inward in said cylinder, substantially as described.

5. The combination, with a driving-shaft, of a plurality of reservoirs, means for periodically supplying air under pressure to said reservoirs, cylinders projecting into said reservoirs, pistons arranged in said cylinders, springs adapted to force said pistons inward, a disorder-alarm valve, and means for operating said alarm by the inward travel of either of said pistons, substantially as described.

6. The combination, with a driving-shaft, of a disorder-alarm, a plurality of reservoirs, a rotating valve adapted to admit air under pressure periodically to each of said reservoirs, a cylinder projecting into each of said reservoirs, pistons arranged in said cylinders, springs for moving said pistons, and a disorder-alarm-controlling valve adapted to be operated by the travel of either of said pistons, substantially as described.

7. The combination, with a driving-shaft, of a rotary-valve casing, means for supplying air under presssure thereto, a rotating valve, and means connecting said valve with said driving-shaft, substantially as described.

8. The combination, with the driving-shaft and the compressed-air reservoirs, of the rotary-valve casing, means connecting said casing with said reservoirs, the rotating valve arranged to periodically admit air to each of said reservoirs, and means for connecting said valve with said driving-shaft, substantially as described.

9. The combination, with the driving-shaft and the compressed-air reservoirs, of the rotary-valve casing 23, tubes connecting said casing with said reservoirs, the rotary valve 26 connected with said driving-shaft, and the spring 34 arranged in said casing and engaging said valve, substantially as described.

10. The combination, with the driving-shaft and the compressed-air reservoirs, of the rotary-valve casing 23, means connecting said casing with said reservoirs, the disorder-alarm, a valve operating said alarm, a rotating valve arranged within said casing 23, and means connecting said valve with said driving-shaft, substantially as described.

11. The combination, with the disorder-alarm and its valve, of a plurality of reservoirs, cylinders projecting into said reservoirs, pistons arranged in said reservoirs and adapted to move therein, springs for moving said pistons against the pressure of air contained within said reservoirs, a valve-operating lever, and means for operating said lever from either of said pistons, substantially as described.

12. The combination, with the disorder-alarm and its valve, of the compressed-air reservoir, a cylinder projecting into said reservoir and having an open end, a piston arranged within said cylinder, a spring engaging said piston, and means for operating the disorder-alarm valve from said piston, substantially as described.

13. The combination, with the disorder-alarm and its valve, of the reservoir 43 and means for supplying compressed air thereto, a cylinder projecting into said reservoir and provided with a tube 47, a piston arranged within said cylinder, a spring engaging said piston, and means for operating the disorder-alarm valve from said piston, substantially as described.

14. The combination, with the reservoir and means for supplying compressed air thereto, of the cylinder projecting into said reservoir, a piston arranged within said cylinder, a spring engaging said piston, a disorder-alarm, a valve controlling said alarm, a lever 61 for operating said valve, and a lever 55 arranged to be operated by the movement of said piston, for the purpose set forth.

15. The combination, with the reservoir, of the bushing 64 arranged in the wall of said reservoir, the plug 65 engaging said bushing and provided with the rod or pin 68 and with the duct 67, substantially as described.

16. The combination, with the disorder alarm or signal 56, of the valve-casing, means for supplying air to said casing, means for connecting said casing with said alarm, the plunger 59 arranged in said casing and provided with the groove 59', and means for controlling the movement of said plunger, substantially as described.

17. The combination, with the signal mechanism provided with the trigger 120, of a suitable spring 122 engaging said trigger and adapted to hold the same in position, substantially as described.

18. The combination, with the signal mechanism and the dial thereof, of the series of triggers arranged to be engaged with the edge of said dial, suitable springs engaging said triggers and adapted to hold the same, when not in use, in any desired position, substantially as described.

In testimony whereof I have hereunto set hand, at Watertown, New York, this 14th day of May, 1901.

HARRY DE WALLACE.

In presence of—
HENRY J. McCORMICK,
DELOS M. COSGROVE.